3,440,142
PRODUCTION OF ASPARAGINASE
Joseph D. Teller, Freehold, N.J., assignor to Worthington Biochemical Corporation, Freehold, N.J., a corporation of New Jersey
No Drawing. Filed Mar. 3, 1966, Ser. No. 531,358
Int. Cl. C12d *13/10*
U.S. Cl. 195—66          2 Claims

ABSTRACT OF THE DISCLOSURE

Asparaginase is prepared by aerobically growing an asparaginase-producing strain of *Escherichia coli* in a fermentation medium, harvesting the *Escherichia coli* cells, extracting the harvested cells to obtain a proteinous aqueous extract containing asparaginase, and purifying and concentrating the extract by fractional precipitation and chromatography, the fermentation medium containing an assimilable nutrient source of carbon and for providing an assimilable source of nitrogen, a peptone which is preferably that which is produced by the pancreatic digestion of casein and which is sold under the trademark N-Z-Amine Type B.

---

This invention relates to a process for the production of asparaginase having anti-tumor activity by growing of *Escherichia coli* in a fermentation medium.

It is known that guinea pig serum inhibits the growth of transplanted tumors in laboratory animals. Further work has established that the inhibitory action of guinea pig serum on tumors is due to the L-asparaginase activity of the serum (Nature, 191, 1114 [1961]). Since the supply of guinea pig serum is inadequate for widespread use in the treatment of animal tumors, it is necessary to establish an alternative supply of asparaginase having anti-tumor activity. It was subsequently found that asparaginase having anti-tumor activity can be produced by growing cells of *Escherichia coli*, strain B, in a fermentation medium, and extracting the harvested cells with an aqueous medium to obtain a proteinaceous extract which on purification yields asparaginase (Mashburn and Wriston, Archives of Biochemistry, 105, 450 [1964]). It has also been found that not all bacterial sources of asparaginase give a product having anti-tumor activity; for example, L-asparaginase derived by fermentation of *Bacillus coagulans* has no anti-tumor activity (Mashburn and Wriston, ibid). The previously used procedures for growing and extracting *E. coli* and for purifying the extract so obtained have proved to be undependable, often resulting in substantial losses of asparaginase. Hence a new procedure for growing and extracting *E. coli* and for purifying the extract to obtain asparaginase having anti-tumor activity is necessary.

According to this invention cells of *Escherichia coli*, strain B, are grown in a fermentation medium in which a peptone serves as a source of nitrogen. The medium may contain a supplemental source of nitrogen and also contains an assimilable source of carbon. The cells are harvested, and extracted with an aqueous medium, and the aqueous extract is prified by a combination of precipitation and chromatography to obtain a fraction rich in L-asparaginase having anti-tumor activity.

Applicant has discovered that the use of a fermentation medium which contains a peptone as its primary nitrogen source is important in providing a dependable process for producion of asparaginase having anti-tumor activity by the growing of *Escherichia coli*. The amount of peptone is usually in the range of 0.5 to 5% of the total weight of the fermentation medium. Best results are usually obtained when the peptone constitutes about 1 to 3% of the fermentation medium. A preferred peptone is a pancreatic digest of casein, available in powdered form under the name "N-Z-Amine Type B" made by the Sheffield Chemical Division of National Dairy Products Corporation, Norwich, N.Y. This peptone contains all of the amino acids, either in free or peptide form, which are present in the original casein. This material has a water solubility of 35 g. per liter at 30° C. A 2% solution of this peptone has a pH of 6.9 to 7.2 at 25° C. The amino nitrogen content of the material is 5.6%, and the total nitrogen content is 12.7%. Another peptone giving good results, although not quite as good as those obtained with "N-Z-Amine B," is "N-Z-Case," which is a tryptic digest of casein, also available in powdered form from the Sheffield Chemical Division of National Dairy Products Corporation. Other peptones obtained by enzymatic digestion of casein also give good results as the nitrogen source of the fermentation medium. In addition, peptones obtained by enzymatic digestion of other proteinaceous materials such as beef can also be used as the source of nitrogen in the fermentation medium of this invention.

Supplemental sources of nitrogen may be used in addition to the peptone. Yeast extract and yeast autolysate are examples of such supplemental sources. The supplemental source of nitrogen is generally an organic source. Although the use of supplemental sources of nitrogen often results in greater yields of asparaginase than would be obtained with the peptone as the sole source of nitrogen, nevertheless these supplemental sources of nitrogen do not give good yields of asparaginase when used as the sole source of nutrient nitrogen to the exclusion of the peptone. Inorganic sources of nitrogen, such as ammonium sulfate, are not used as sources of nutrient nitrogen since their use does not give good yields of asparaginase. The addition of refined amino acids, such as asparagine, alanine, glycine and aspartic has been found to be of not value in enhancing the yield of asparaginase.

The fermentation medium also contains a supplemental assimilable source of carbon. Dextrose has been found to serve this purpose well.

The fermentation medium is buffered and adjusted to the desired pH. A phosphate buffer comprising the mono- and dihydrogen phosphates of either potassium or sodium may be used for this purpose. The pH is adjusted to a value generally in the range of about 7.0 to about 8.5; very good results are obtained if the pH is about 7.5. Any of the common bases, preferably a water soluble base such as sodium hydroxide may be used to adjust the pH.

A number of strains of *Escherichia coli*, notably those which are identified in the art as "Strain B," have been found to produce asparaginase. A strain of *E. coli* which has been found to yield asparaginase having anti-tumor activity is ATCC 11303, which is obtainable from the American Type Culture Collection, Rockville, Maryland.

In carrying out fermentation according to this invention, a stock culture of *Escherichia coli* is transferred to the fermentation medium, and the fermentation medium is incubated at 37° C. with vigorous aeration for a period of about 16 to 24 hours. This results in a heavy growth of bacterial cells. It is generally desirable to transfer this heavy growth from the initial fermentation medium to a second fermentation medium, which may be of the same composition as the first medium, and to continue fermentation with vigorous aeration at about 37° C. until maximum growth is obtained, usually about 18 to 24 hours. The cells are harvested by known means such as centrifugation.

The harvested cells are either lyophilized or frozen and are stored in the lyophilized or frozen state until ready for use. These steps may be omitted in those cases where it is convenient to use the harvested cells directly without storage.

The next operation is to extract asparaginase from the harvested cells. To this end, frozen cells are thawed and homogenized in a buffered aqueous medium which is maintained at a pH in the range of about 8.0 to 9.0. An excellent buffer for this purpose is tris-(hydroxymethyl-aminomethane), commonly referred to as "tris buffer" adjusted to a pH of 8.6 with a strong or moderately strong inorganic acid such as hydrochloric acid. Lyophilized cells are ground, as for example in a ball-mill or mortar and pestle and then suspended in a buffered aqueous medium as aforedescribed. The volume of buffered aqueous medium required for lyophilized cells is considerably greater than that necessary for either frozen cells or fresh harvested cells, because of the water required for reconstitution. For example, about 5 volumes of aqueous medium per volume of frozen or fresh cells may be used in forming a cell suspension, while about 20 volumes of aqueous medium per volume of cells is used for suspending lyophilized cells.

The cells are allowed to remain in the aqueous extracting medium sufficiently long for the extraction of the asparaginase activity, and may be agitated if desired in order to accelerate extraction. The extracted cell debris may be separated from the aqueous extracting medium by conventional means such as centrifugation or filtration.

An aqueous extract is fractionated to remove proteinaceous materials other than asparaginase. The first step is the removal of dioxyribonucleic acid (DNA). Manganous chloride is an efficient reagent for this purpose. Other DNA precipitants include protamine sulfate and steptomycin sulfate. The enzyme deoxyribonuclease, which depolymerizes DNA, can also be used to remove DNA from the extract.

Other undesirable proteinaceous constituents may be removed by fractional precipitation using known protein precipitants. Ammonium sulfate is preferred, primarily because of its high water solubility. A first portion of ammonium sulfate is added to the filtrate in an amount sufficient to form approximately 55% saturated solution. This causes a substantial portion of the undesired proteins to be precipitated while leaving most of the asparaginase activity in solution. A second portion of ammonium sulfate is then added to the filtrate to produce a saturated solution. This precipitates the bulk of the asparaginase activity, and the filtrate remaining is discarded.

The asparaginase-rich precipitate is suspended in a suitable aqueous medium, such as phosphate buffer (e.g. sodium monohydrogen phosphate-sodium dihydrogen phosphate) having a pH of 7.0 to 7.5, and dialyzed in order to remove a major portion of the salt content. Phosphate buffer may also be used as the dialysis medium.

The dialyzed solution can be further fractionated by the stepwise addition of methanol. The temperature is maintained below −5° C. during methanol addition. A relatively small first portion of methanol, about 20 to 25% based on the volume of dialyzed solution, is added and the precipitate removed and discarded. A second and considerably larger portion of the methanol, about 150 to 200% based on the volume of solution is then added to the supernatant solution, and the asparaginase-rich precipitate from this second stage is recovered. This precipitate is then suspended in phosphate buffer and dialyzed in order to remove the methanol. The amount of phosphate buffer is about ⅓ of the volume of solution in the first dialysis step. The dialyzed solution is then further purified by chromatography. The methanol fractionation and the second dialysis step which follows can be omitted if desired, and this omission in no way affects the ultimate recovery of asparaginase having anti-tumor activity in good yields. When the methanol fractionation and second dialysis step are omitted, the dialyzed solution from the first dialysis step is then subjected directly to chromatography.

Applicant has found that chromatography using a column of diethylaminoethyl cellulose (DEAE) as the adsorbent and aqueous sodium phosphate buffer as the eluant consistently yields highly purified asparaginase having anti-tumor activity. On the other hand, other chromatographic systems such as one employing calcium hydroxylapatite as the adsorbent do not consistently result in purification of asparaginase. In the procedure of this invention, a column of diethylaminoethyl cellulose is equilibrated with a dilute (0.02 M) sodium phosphate buffer having a pH of about 7.0 to 7.5. The asparaginase-rich solution is then applied to this column. The column is then washed with the same dilute buffer as that used for equilibration until the material coming off the column has a minimum protein content, usually that giving an absorbancy reading of about 0.050 at 280 millimicrons. This material is discarded. Asparaginase is then eluted from the adsorbent by the addition of a more concentrated phosphate buffer, e.g. 0.1 M sodium phosphate buffer having a pH of about 7.35. The solution eluted from the column is collected in approximately 25 ml. fractions. The fractions containing the bulk of the asparaginase activity are pooled. The resulting asparaginase-rich solution is then dialyzed with water, distilled water being preferred. Dialysis is continued until most but not quite all of the salt is removed. Complete salt removal is avoided since this may lead to inactivation of the asparaginase. Generally about 4 hours is required for dialysis, and longer periods are avoided because inactivation usually results.

The enzyme asparaginase is recovered from the dialyzed solution, preferably by lyophilization.

This invention will now be described in detail with reference to specific embodiments thereof, as illustrated by the following examples.

Example 1

A culture of *Escherichia coli* strain B (ATCC 11303) is transferred from stock culture to a fresh tube of nutrient agar. After growth at 37° C. for about 18 hours, the surface growth is transferred to a flask containing 250 ml. of aqueous sterile medium of the following composition (all percentages are by weight):

| | Percent |
|---|---|
| $K_2HPO_4$ | 1.1 |
| $KH_2PO_4$ | 0.85 |
| Dextrose | 1.0 |
| Peptone ("N-Z-Amine Type B") | 2.0 |
| Yeast extract | 0.6 |
| Water | Balance |

The pH is adjusted to 7.5 with 5 M NaOH. The dextrose is sterilized separately from the rest of the medium before being added thereto.

"N-Z-Amine Type B" is a product of Sheffield Chemical Division of National Dairy Products Corporation, Norwich, New York. This material is a peptone derived by pancreatic digestion of casein, and contains all the amino acids, either in free or peptide form, which are present in the original casein. In a typical analysis the amino nitrogen content is 5.6%, and the total nitrogen content is 12.7% by weight, the ratio of amino nitrogen to total nitrogen typically being 42.9. Other substances in a typical analysis as published by the producer are 5.6% of ash, 1.7% of sodium, 0.23% of chloride, 29 p.p.m. of iron, 2.39% of total phosphates, and 0.21% of calcium. The water solubility is 35 g. per liter at 30° C. A 2% aqueous solution has a pH of 6.9 to 7.2 at 25° C. The amino acid assay as published by the producer is as follows:

| | Percent |
|---|---|
| Glycine | 1.8 |

|  | Percent |
|---|---|
| Alanine | 3.1 |
| Valine | 6.1 |
| Leucine | 9.4 |
| Isoleucine | 4.6 |
| Serine | 6.2 |
| Threonine | 4.2 |
| Lysine | 7.6 |
| Arginine | 3.9 |
| Aspartic acid | 5.9 |
| Glutamic acid | 19.6 |
| Proline | 10.8 |
| Histidine | 2.9 |
| Tryptophane | 1.6 |
| Phenylalanine | 5.0 |
| Tyrosine | 3.2 |
| Cystine | 0.46 |
| Methionine | 2.4 |

The flask is incubated at 37° C. with vigorous aeration for 18 hours. At this time the heavy population of bacteria cells is added to 10 liters of sterile medium of the above composition. The cells are again cultured with aeration at 37° C. At the time of maximum growth, usually between 18 and 24 hours, the cells are harvested by centrifuging. The cells are then freeze-dried.

The freeze-dried cells are ground in either a mortar and pestle or in a ball-mill and homogenized in 20 volumes (gm./ml.) of 0.05 M tris buffer, pH 8.6. (Tris buffer is the name given to a buffer having tris-(hydroxymethylaminomethane) as its principal constituent). The cell extract is separated from the broken cell debris by centrifugation or filtration. To each liter of extract, 50 ml. of 1.0 M $MnCl_2$ is added with stirring. The precipitate is removed by centrifugation or filtration and discarded. To the supernatant 351 grams of solid ammonium sulfate is added per liter of solution. The precipitate is removed by filtration or centrifugation and discarded. Solid ammonium sulfate is again added to the supernatant solution until the solution is saturated, requiring approximately 342 grams per liter. After standing for ½ hour, the precipitate is collected by centrifugation and the supernatent discarded. The precipitate is dissolved in distilled water using approximately 50 to 100 ml. of water for every 100 grams of dried or 400 grams of wet bacterial cells. The solution is then dialyzed over night against running distilled water, and any precipitate formed during dialysis is removed.

To every 100 ml. of the cleared dialyzed solution, 22.7 ml. of 75% methyl alcohol is added, while the temperature is kept below −5° C. The precipitate is then removed by centrifugation at −5° C. To every 100 ml. of the supernatant solution 168 ml. of 100% methyl alcohol is added, while the temperature is kept below −5° C. The precipitate is recovered by centrifugation, discarding the supernatant. The precipitate is suspended in phosphate buffer (0.1 M $Na_2HPO_4$-$NaH_2PO_4$, pH 7.15) having approximately ⅓ the volume of the extract after the initial dialysis and before the addition of any methyl alcohol. This suspension is dialyzed for 18 hours against the same buffer. After dialysis, the suspension is centrifuged and the precipitate discarded. The clear supernatant solution is further purified by chromatography.

The above mentioned clear solution, which is an aqueous solution containing asparaginase, is diluted with distilled water to 0.02 M, which is a dilution of 1 part of solution and 3 parts of water. This solution is then applied to a column of diethylaminoethyl cellulose (DEAE), approximately 1 x 29 inches and previously equilibrated with 0.02 M sodium phosphate buffer, pH 7.35. About 400 ml. of the diluted solution is applied to the column. The column is then washed with the same buffer until the material coming off the column has a minimum protein content, usually that giving a reading of 0.050 absorbancy at 280 mμ. The asparaginase is then eluted from the column using 0.1 M sodium phosphate buffer, pH 7.35, as the eluant. The eluted solution is collected in approximately 25 ml. fractions. The fractions containing the bulk of the purified asparaginase activity are pooled. The purified asparaginase solution is dialyzed against distilled water for 4 hours. Longer periods of dialysis result in inactivation. Dialysis is stopped while a small portion of salt remains in the asparaginase solution, since complete removal of salt renders the enzyme unstable and therefore inactive. The dialyzed solution is frozen and dried in vacuo in the frozen state.

The activity of the asparaginase is determined at various stages of purification using a standard assay system. The procedure is based on the estimation of ammonia formed from asparagine in the following enzyme-catalyzed reaction:

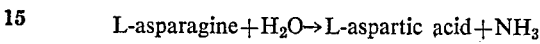

To tubes which each contain 1.7 ml. of 0.01 M L-asparagine in tris buffer (0.05 M, pH 8.6) are added 0.1 to 0.3 ml. of the enzyme (1.0 mg./ml.) in tris buffer followed by tris buffer to give a final volume of 2.0 ml. in each tube. The resultant solution is incubated at 37° C. for 30 minutes and then 0.1 ml. of 1.5 M trichloracetatic acid is added. The suspension is centrifuged for 5 minutes, and the supernatant is poured off. A control tube in which the enzyme is added after the trichloracetatic acid is run for each enzyme level. A 0.5 ml. portion of the supernatant is diluted with 7.0 ml. of water, and 1.0 ml. of Nessler's reagent is added. The color is observed after 10 minutes at 480 mμ. An ammonium sulfate standard containing 20 micrograms (1.428 micromols) of nitrogen per ml. is run as a blank, using a 0.5 ml. aliquot of solution. One unit of activity is that amount of asparagine which liberates 1.0 micromol of ammonium nitrogen per minute.

Example 2

The procedure of Example 1 is followed except that instead of freeze-drying, the cells are frozen, stored in the frozen state until used, and are then thawed and homogenized in five volumes (grams per milliliter) of 0.05 M tris buffer, pH 8.6. The incubation and harvesting of the *E. coli* cells, and the extraction of the cells and recovery of asparaginase, are carried out in the same manner as in Example 1.

Example 3

The procedure of Example 1 is repeated except that addition of methyl alcohol and the dialysis step following such addition are omitted. Instead, dialyzed solution obtained from the first dialysis step, i.e., the step following ammonium sulfate precipitation and dissolution of the resulting precipitate in water, is purified by chromatography without any intermediate fractional precipitation procedures. A highly purified asparaginase having anti-tumor activity is obtained by chromatography as in Example 1.

The process of the present invention provides a reliable process for obtaining asparaginase having anti-tumor activity in large quantities with good yields.

Although this invention has been described with reference to specific embodiments thereof, it is understood that such description is by way of illustration and not by way of limitation.

What is claimed is:

1. In a process of preparing asparaginase which comprises aerobically growing an asparaginase-producing strain of *Escherichia coli* in a fermentation medium, harvesting the *Escherichia coli* cells, extracting from the harvested cells a proteinous aqueous extract comprising asparaginase and purifying and concentrating said asparaginase, the improvement which comprises growing said *Escherichia coli* cells in a fermentation medium containing an assimilable source of carbon and from about 1% to about 3% based on the weight of the fermentation medium of the peptone N-Z-Amine Type B which is produced by pancreatic digestion of casein.

2. A process according to claim 1 wherein the fermentation medium also includes a supplemental source of nutrient nitrogen selected from the group consisting of yeast extract and yeast autolysate.

References Cited

UNITED STATES PATENTS 2,997,425  8/1961  Singher et al. _____ 195—66

OTHER REFERENCES

Mashburn et al.: Archives of Biochemistry 105, 450–452 (1964).

Guha et al.: article entitled "Asparaginase Activity of *Salmonella typhosa*," abstracted in Chemical Abstracts 1963, vol. 58, 14461–14462.

LIONEL M. SHAPIRO, *Primary Examiner.*